Feb. 20, 1951    E. J. ROOS    2,542,780
MEANS FOR MAKING AND ASSEMBLING FITTINGS
Filed May 14, 1946    2 Sheets-Sheet 2
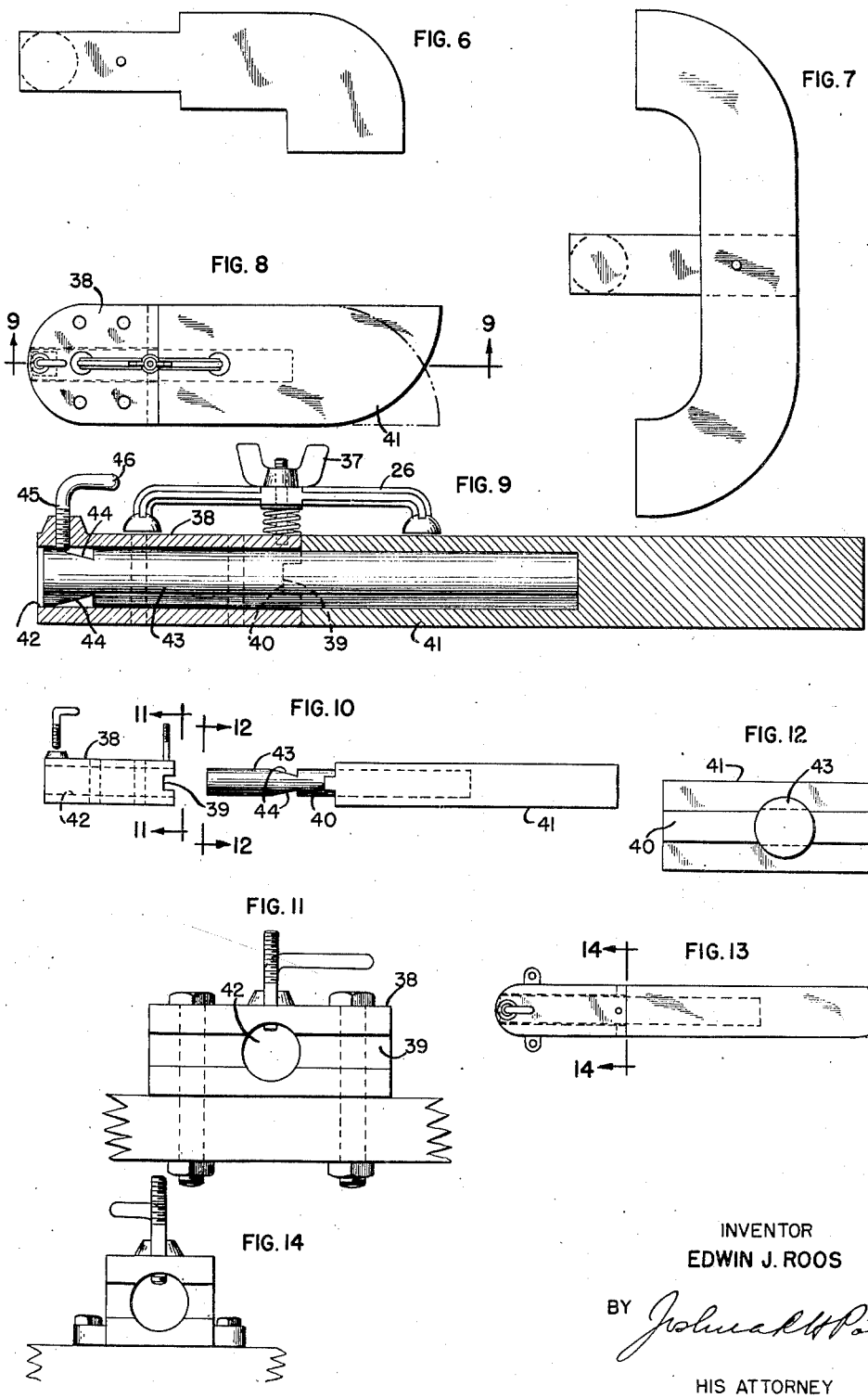
INVENTOR
EDWIN J. ROOS
HIS ATTORNEY Patented Feb. 20, 1951

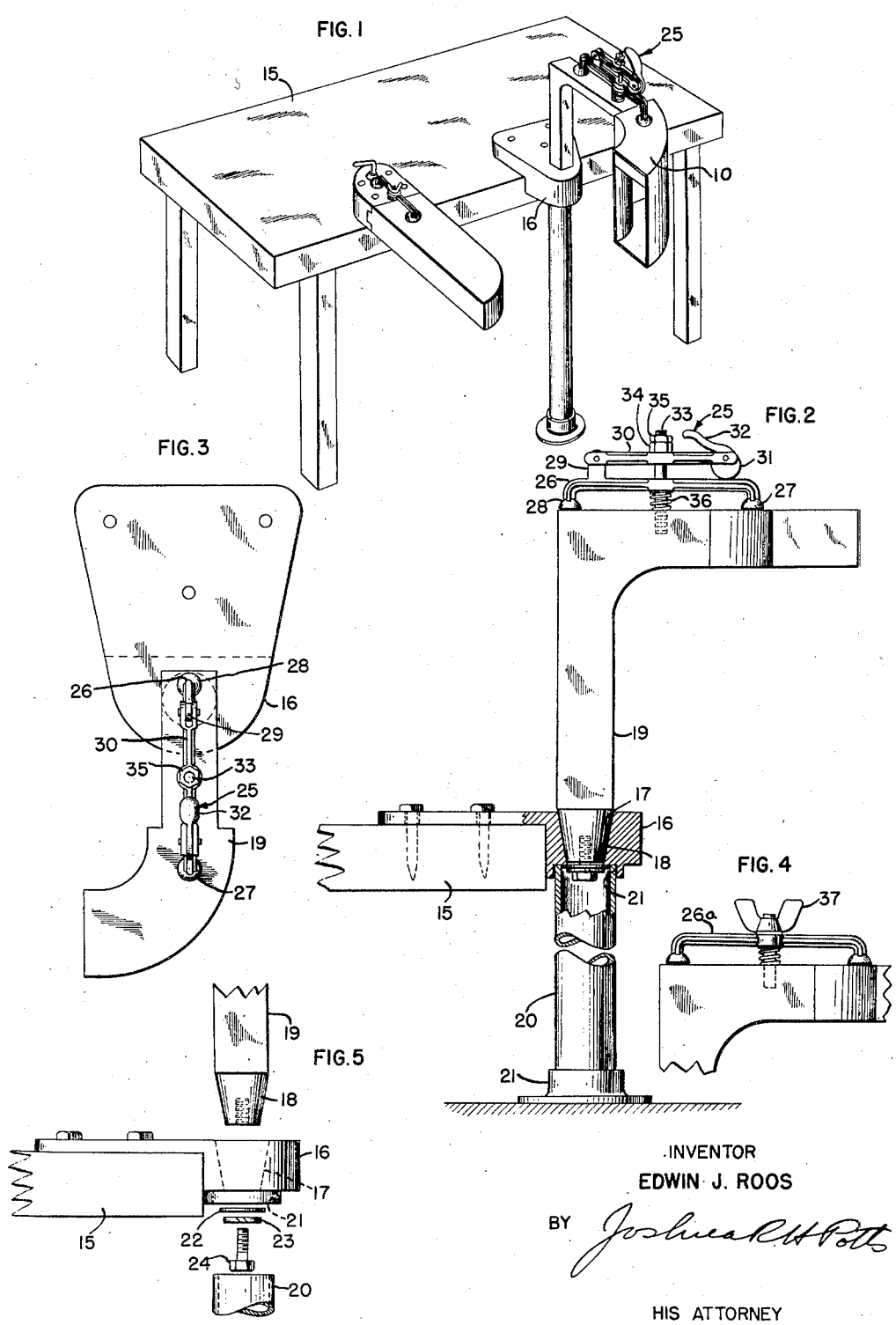

2,542,780

UNITED STATES PATENT OFFICE 2,542,780

MEANS FOR MAKING AND ASSEMBLING FITTINGS

Edwin J. Roos, Chicago, Ill.

Application May 14, 1946, Serial No. 669,642

3 Claims. (Cl. 29—288)

This invention relates to improvements in making and assembling sheet metal fittings.

There have been many disadvantages in making and assembling fittings, as is well known to people acquainted with this art.

The object of my invention is to remove disadvantages attending the making and assembling of fittings.

My invention includes means for supporting a fitting in assembling the fitting with other fittings.

My invention includes further, an assembly supporting member which may be one of a number of different types such as shown in Figs. 2, 6 and 7, in accordance with the form of the fitting to be supported.

My invention also includes clamping means for clamping a fitting on the assembly support.

My invention also includes means for forming or making fittings. This means also includes different kinds of patterns adapted to be removably and/or reversibly held in a holding member.

It is believed that because of the changes which I have made in the making and assembling of fittings that such will become simpler, speedier and much more economical. The significance of these changes will be apparent only to those who have or are making or assembling fittings.

Another object of the invention has been the accomplishment of the foregoing in a manner which is simple to make and operate and relatively inexpensive.

These and other objects and advantages will appear and be brought out more fully in the following specification, reference being had to the accompanying drawings, in which:

Fig. 1 is a perspective view showing both the means for assembling the fittings, including the clamping means, and the means for making fittings, to-wit, a seaming stake.

Fig. 2 is a side view of the assembling means shown in Fig. 1.

Fig. 3 is a plan view.

Fig. 4 is an elevation of an alternative form of clamping means.

Fig. 5 is an exploded view of the means for joining the supporting elements to a table.

Fig. 6 is a plan view of an alternative seaming stake adapted to be substituted in the device shown in Fig. 1.

Fig. 7 is a plan view of still another seaming stake adapted to be substituted in the device shown in Fig. 1.

Fig. 8 is a plan view of another seaming stake for assembling fittings.

Fig. 9 is a view, partly in elevation and partly in section of the means for removably attaching a fitting to a support which may be mounted on a table.

Fig. 10 is an exploded view of the same.

Fig. 11 is an end view of the holding means.

Fig. 12 is an end view of the removable fitting shown in Fig. 10.

Fig. 13 is a plan view of a modified form of the device shown in Fig. 10, the same being provided with ears for supporting the holding element on a table.

Fig. 14 is an end view of the holding element of Fig. 13, taken on the line 14—14 of Fig. 13.

Referring to the drawings in detail, in which I have shown the preferred form for the purpose of illustrating the principle of my invention, I have shown a table 15.

Adapted to be secured to the table by any suitable means is supporting member 16. The supporting member 16 has a bore 17, in which the lower end 18 of a fitting-holding member, or seaming stake, 19 is adapted to be received.

Adapted to be connected to the supporting member 16 is a tubular member 20, supported in a flange 21 on the floor.

The upper end of the tubular member 20 is adapted to fit into a bore 21 in the supporting member 16.

The lower end 18 of the fitting-holding member is adapted to be fixed to the supporting member by means of a flat washer 22, lock washer 23 and screw 24.

Adapted to be mounted on the fitting-holding member 19 is a clamp 25.

The clamp has a base 26, having a pair of legs 27 and 28, and an upwardly-extending neck 29.

Adapted to be pivoted to the neck 29, is a horizontal member 30, which, in turn, is pivoted to an eccentric clamping device 31, having a lever 32.

A stud 33 is adapted to extend through the members 30 and 26, into a tapered hole in fitting-holding member 19; and, the stud is provided with adjusting nuts 34 and lock nut 35, to hold the base 26 on the fitting support 19, and to adjust the tension between the support and the base.

A spring 36 is provided to urge the clamp away from the work when the tension is released, as will be readily understood by those skilled in the art.

When it is desired to tension the clamp on the work under leg 27, the lever 32 may be operated to turn the eccentric to place pressure on the work, to hold it in place.

In Fig. 4, I have shown a modified form of clamp. In this form, it is only the base 26a, shown in Fig. 2. A stud and spring are provided, as in Fig. 2, and a wing nut 37 also, to tighten the parts, as will be readily understood.

The device which I have shown is for the purpose of assembling sheet metal ducts and fittings to each other, as illustrated in Fig. 1.

The seaming stake 19 is shown supporting a fitting 10 and its flanges in assembly with other fittings and their flanges, as will be readily understood by those skilled in the art.

Instead of the seaming stake 19, as heretofore described, there may be substituted in the supporting member 16 any one of a number of other assembly members, such as the seaming stakes shown in Figs. 6 and 7.

In Fig. 8, I have shown patterns for forming fittings, and means for changing the patterns, also holding means for the same.

Referring to Fig. 8, I have shown a holding member 38, which may be attached to the table by any suitable means.

The holding member has grooves 39, adapted to fit with tongues 40 on a pattern member 41.

The holding member has a bore 42, adapted to receive an extension 43, which preferably has a snug fit in the bore.

The extension 43 is shown fixed to the pattern member 41.

The extension is provided with tapered surfaces 44.

After the pattern and its extension have been pushed into the holding member, it will then be possible to turn a screw 45, having a handle 46, to move against one of the tapered portions and lock the pattern member in place.

In case it is desired to make a pattern having an opposite curvature, all that is necessary is to turn the lever 46 out of contact with the tapered portion 44, and then pull the pattern member far enough to bring the tongue out of engagement with the groove. Then the pattern member may be rotated one hundred and eighty degrees and inserted back where it was. Then, the lever 46 may be operated to lock the pattern in place, as before.

Instead of the patterns shown in Fig. 8, any one of a number of other patterns may be used. The only difference between the holding member shown in Fig. 13 and that shown in Fig. 10 is that the holding member is provided with ears for convenience in attaching the same to a table.

In Figs. 8 and 9, I have shown a clamp, such as in Fig. 4, in combination with the fitting holder.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modification as come within the scope of the appended claims.

Having thus described my invention, what I claim as new and desire to secure by Letters Patent is:

1. Supporting means for supporting sheet metal fittings, and the like, during processing or assembling operations, comprising: a table having a bracket secured thereto, and projecting laterally clear of said table, said bracket having a tapered bore therethrough, and a socket in its under face, surrounding said bore; a supporting post extending into said socket, and supporting the projecting portion of said bracket a vertically extending post having its lower end tapered to fit said bore, and at its opposite end provided with an angular extension adapted to be engaged by the work; and a clamping means carried by said angular extension, normally urged to open disengaged position, and adapted to clamp the work to said extension, said clamping means being of inverted U-shape, carrying a pivoted lever, and a cam operated by said lever for actuating said clamp.

2. In a device for supporting sheet metal fittings during forming and assembling operations, the combination of: a table having a side edge, a supporting member secured to said table and projecting over said side edge in a substantially horizontal position, said supporting member being formed with an upper tapered socket and a lower cylindrical socket in vertical alignment, a seaming stake having a vertical leg and a horizontal arm integrally joined, the lower end of said leg being tapered and complemental to said tapered socket in which it is adapted to fit, a vertical supporting member having an upper end received in said cylindrical socket, a detachable connection between the lower end of said leg and the first supporting member, and clamping means carried by said horizontal arm for detachably clamping a sheet metal fitting thereto.

3. In a device for supporting sheet metal fittings during forming and assembling operations, the combination of: a table adapted to be supported on a floor, having a side edge, a supporting member secured to said table and projecting over said side edge in a substantially horizontal position, said supporting member being formed with an upper tapered socket and a lower cylindrical socket in vertical alignment, a seaming stake having a vertical leg and a horizontal arm integrally joined, the lower end of said leg being tapered socket in which it is adapted to fit, a tubular supporting member having an upper end received in said cylindrical socket, means at the lower end of said tubular supporting member for anchoring said end to the floor on which said table is supported, a detachable screw connection between the lower end of said leg and the first said supporting member, and clamping means carried by said horizontal arm for detachably clamping a sheet metal fitting thereto.

EDWIN J. ROOS.

REFERENCES CITED

The following references are of record in the file of this patent:

UNITED STATES PATENTS

| Number | Name | Date |
| --- | --- | --- |
| 1,027,419 | Hines | May 28, 1912 |
| 1,251,516 | Hardesty | Jan. 1, 1918 |
| 1,452,991 | Torchia | Apr. 24, 1923 |
| 1,990,418 | Rostkowski | Feb. 5, 1935 |
| 2,221,326 | Holman | Nov. 12, 1940 |
| 2,401,000 | Kucyn | May 28, 1946 |